United States Patent
Gibbs et al.

(10) Patent No.: US 9,459,421 B2
(45) Date of Patent: Oct. 4, 2016

(54) AERIAL OPTICAL FIBER CABLES

(75) Inventors: Carlton Gibbs, Powder Springs, GA (US); Mark G Graveston, Newport (GB); Jason Pedder, Chepstow (GB); Peter A Weimann, Atlanta, GA (US)

(73) Assignee: OFS FITEL, LLC, Norcross, GA (US)

( * ) Notice: Subject to any disclaimer, the term of this patent is extended or adjusted under 35 U.S.C. 154(b) by 0 days.

(21) Appl. No.: 14/381,738

(22) PCT Filed: Jul. 27, 2012

(86) PCT No.: PCT/US2012/048517
§ 371 (c)(1),
(2), (4) Date: Aug. 28, 2014

(87) PCT Pub. No.: WO2013/130121
PCT Pub. Date: Sep. 6, 2013

(65) Prior Publication Data
US 2015/0049996 A1    Feb. 19, 2015

Related U.S. Application Data

(60) Provisional application No. 61/606,033, filed on Mar. 2, 2012.

(51) Int. Cl.
*G02B 6/44* (2006.01)
*G02B 6/48* (2006.01)

(52) U.S. Cl.
CPC ............ *G02B 6/441* (2013.01); *G02B 6/4432* (2013.01); *G02B 6/4434* (2013.01); *G02B 6/4436* (2013.01); *G02B 6/483* (2013.01)

(58) Field of Classification Search
CPC .. G02B 6/4401; G02B 6/441; G02B 6/4415; G02B 6/4422; G02B 6/4432; G02B 6/4434; G02B 6/4436; G02B 6/483
USPC .................................................. 385/103, 106
See application file for complete search history.

(56) References Cited

U.S. PATENT DOCUMENTS

| | | | |
|---|---|---|---|
| 4,973,611 A * | 11/1990 | Puder .............................. | 522/42 |
| 5,233,678 A * | 8/1993 | Katurashima et al. ........ | 385/112 |
| 6,374,023 B1 * | 4/2002 | Parris ............................ | 385/109 |
| 6,381,390 B1 * | 4/2002 | Hutton et al. ................. | 385/114 |
| 6,701,047 B1 * | 3/2004 | Rutterman et al. ........... | 385/102 |
| 6,931,190 B2 * | 8/2005 | Ino et al. ...................... | 385/128 |
| 7,006,740 B1 * | 2/2006 | Parris ............................ | 385/109 |
| 7,295,737 B2 * | 11/2007 | Moorjani et al. ............. | 385/123 |
| 7,382,955 B1 * | 6/2008 | Keller ............................ | 385/109 |
| 7,567,741 B2 * | 7/2009 | Abernathy et al. ........... | 385/113 |
| 7,750,060 B2 * | 7/2010 | Zahora et al. .................. | 522/97 |
| 8,855,455 B2 * | 10/2014 | Keller et al. .................. | 385/110 |
| 2007/0031096 A1 * | 2/2007 | Moorjani et al. ............. | 385/128 |
| 2007/0212004 A1 * | 9/2007 | Lu ......................... | G02B 6/4475 385/100 |
| 2008/0273845 A1 * | 11/2008 | Weimann ....................... | 385/103 |
| 2010/0189399 A1 * | 7/2010 | Sillard et al. ................. | 385/126 |
| 2011/0188819 A1 * | 8/2011 | Keller et al. .................. | 385/103 |
| 2012/0099825 A1 * | 4/2012 | Messer .......................... | 385/113 |
| 2013/0129290 A1 * | 5/2013 | Keller et al. .................. | 385/112 |

\* cited by examiner

*Primary Examiner* — Peter Radkowski
(74) *Attorney, Agent, or Firm* — Koji Noguchi, Esq.

(57) ABSTRACT

Described are cable designs adapted for aerial installations wherein the cable comprises a bundle of multifiber tight buffer encasement units, with a conformal thin skin containment layer surrounding the bundle. The multifiber tight buffer encasement units have an acrylate compliant inner layer that protects the fiber and minimizes stress transfer to the fiber; and a hard, tough acrylate outer layer that provides crush resistance. The thin skin containment layer provides cable integrity with a minimum of added size and weight. The thin skin containment layer encasement is encased in an outer protective jacket.

21 Claims, 3 Drawing Sheets

AERIAL OPTICAL FIBER CABLES

RELATED APPLICATIONS

This application claims the benefit of provisional application 61/606,033 filed Mar. 2, 2012, which is incorporated herein by reference.

FIELD OF THE INVENTION

This invention relates to optical fiber cables specially adapted for aerial installations.

BACKGROUND OF THE INVENTION (Parts of this background may or may not constitute prior art.)

Aerial distribution cables are desirable for use in fiber-to-the-home, fiber-to-the-premises, or fiber-to-the-node broadband communications networks. These are especially worthwhile in construction of such high-speed networks in small towns and rural areas, where communications services are most economically provided using an existing aerial right of way.

Traditional loose tube or central core optical cables are relatively bulky and heavy, and can be difficult to install and handle at closures, junction boxes, etc, where the cable jacket may need to be stripped for routing of fibers and cables. Furthermore, if the cables are large and heavy it may be necessary to reinforce or replace existing telephone poles to support the added weight of the optical distribution cable. Last, the tubes of a loose tube cable or ribbons in a central core ribbon cable can be difficult to route inside closures. Loose buffer tubes tend to be stiff and hard to bend, while ribbons have a preferential bend that can make them difficult to route.

For loose tube cable designs, stiff thin-walled plastic tubes are often used. These stiff tubes, typically made out of a polymer like polybutylene terethphalate (PBT), are larger than the desired size of the cable units, and are prone to kinking permanently when handled. In some cases, it is necessary to remove the stiff buffer tube and route the relatively fragile optical fibers in a more flexible tube. Such practices add to the time and expense of deploying optical broadband distribution networks.

Another approach to reducing the size and weight of aerial cables is to use cables containing thin walled, soft 'microsheath' tubes to bundle the fibers, as disclosed in U.S. Pat. Nos. 6,334,015 and 7,082,241 by Sagem S A, to bundle the optical fibers. The softer tubes may meet the desired compact size of the units, but these tubes typically contain filling compound, which must be cleaned, and is an annoyance to installers. In addition, the soft microsheath tube material sometimes tends to stick to the overextruded cable sheath. When that occurs, and an installer attempts to remove cable sheath, the microsheath tube material may be inadvertently removed or torn thereby exposing the fibers and making it more difficult to determine which fiber is which. Barrier tapes or other protective materials may be included in the cable sheath structure to help prevent damage to the microsheath tubes, but this adds to the cost and complexity of the cable.

An alternate solution that has been used in some European countries is to first aerially install lightweight microduct, then later install air-blown cabled fiber units (often referred to as ABFUs) such as OFS's AccuBreeze™ or many similar commercially-available products in the microduct later. However this is inefficient, as two different installation steps are required. Also, there is a limit to the amount of fiber that can be installed in the conduit, as current commercially available ABFUs are limited to fiber counts of 12.

Thus there is a need for improved lightweight, compact, aerial cables with high fiber counts that can be installed easily in one operation.

STATEMENT OF THE INVENTION

We have designed a new cable structure, adapted for aerial installations, that uses multiple multifiber tight buffer encasement units contained by a common thin-skin containment sheath. The multifiber tight buffer encasement units comprise a dual-layer optical fiber buffer encasement of acrylate resin having a compliant acrylate inner layer that protects the fiber and minimizes stress transfer to the fiber, and a hard, tough acrylate outer layer that provides crush resistance. The multifiber tight buffer encasement units are bundled, and preferably twisted, and jacketed with the thin-skin containment sheath. The cable is completed using an outer protective polymer jacket.

DETAILED DESCRIPTION

Figure 1:
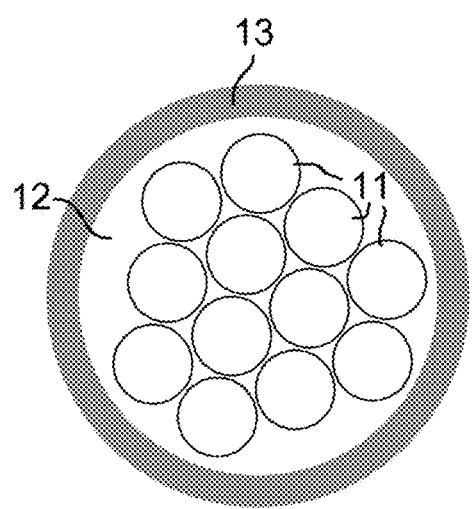
FIG. 1 is a schematic cross section of a multifiber tight buffer unit used in the multiple multifiber tight buffer unit cable of the invention.

A typical multifiber tight buffer encasement unit of the invention is shown in FIG. 1. In FIG. 1, a twelve fiber embodiment is shown with the twelve optical fibers 11, encased and embedded in a soft acrylate matrix 12. As is well known, reference to an optical fiber means a glass fiber coated with a polymer protective coating. The elements in the figures are not drawn to scale. Surrounding and encasing the soft acrylate matrix is a relatively hard acrylate encasement layer 13. Together, the optical fibers, the acrylate matrix, and the acrylate encasement layer, comprise a round dual layer optical fiber tight buffer encasement. In this embodiment the multifiber tight buffer encasement contains 12 optical fibers, but may contain from 2-24 optical fibers. Multifiber tight buffer encasements with 4 to 12 optical fibers may be expected to be most common in commercial practice. The multifiber tight buffer encasement unit shown in FIG. 1 is described in greater detail in U.S. Pat. No. 7,720,338, which is incorporated herein by reference.

The dual-layer acrylate construction of the multifiber buffer encasement, with the soft inner layer and hard outer layer, functions to minimize transfer of bending and crushing forces to the optical fibers, thus minimizing signal attenuation. In some embodiments the multifiber tight buffer encasement may have an oval cross section.

The term matrix is intended to mean a body with a cross section of matrix material in which other bodies (optical fibers) are embedded. Encasement is intended to mean a layer that both surrounds and contacts another body or layer.

The soft acrylate matrix and the hard acrylate encasement are preferably UV-curable acrylates. Other polymers may be substituted. The UV-curable resins may contain flame-retardants to improve the overall fire resistance of the cable. This may be a polymer layer extruded over the optical fiber buffer encasement, and may be useful in especially demanding applications, such as cables required to meet the NFPA 262 Plenum fire standard. The extruded flame-retardant coating may be made from: PVC, low-smoke PVC, PVDF, FEP, PTFE, compounded fluoropolymer blends, low-smoke zero halogen polyolefin-based resins, flame retardant thermoplastic elastomers, and flame retardant nylons. Specific examples are Dow Chemical DFDE-1638-NT EXP2 and AlphaGary Megolon 8142.

Figure 2:
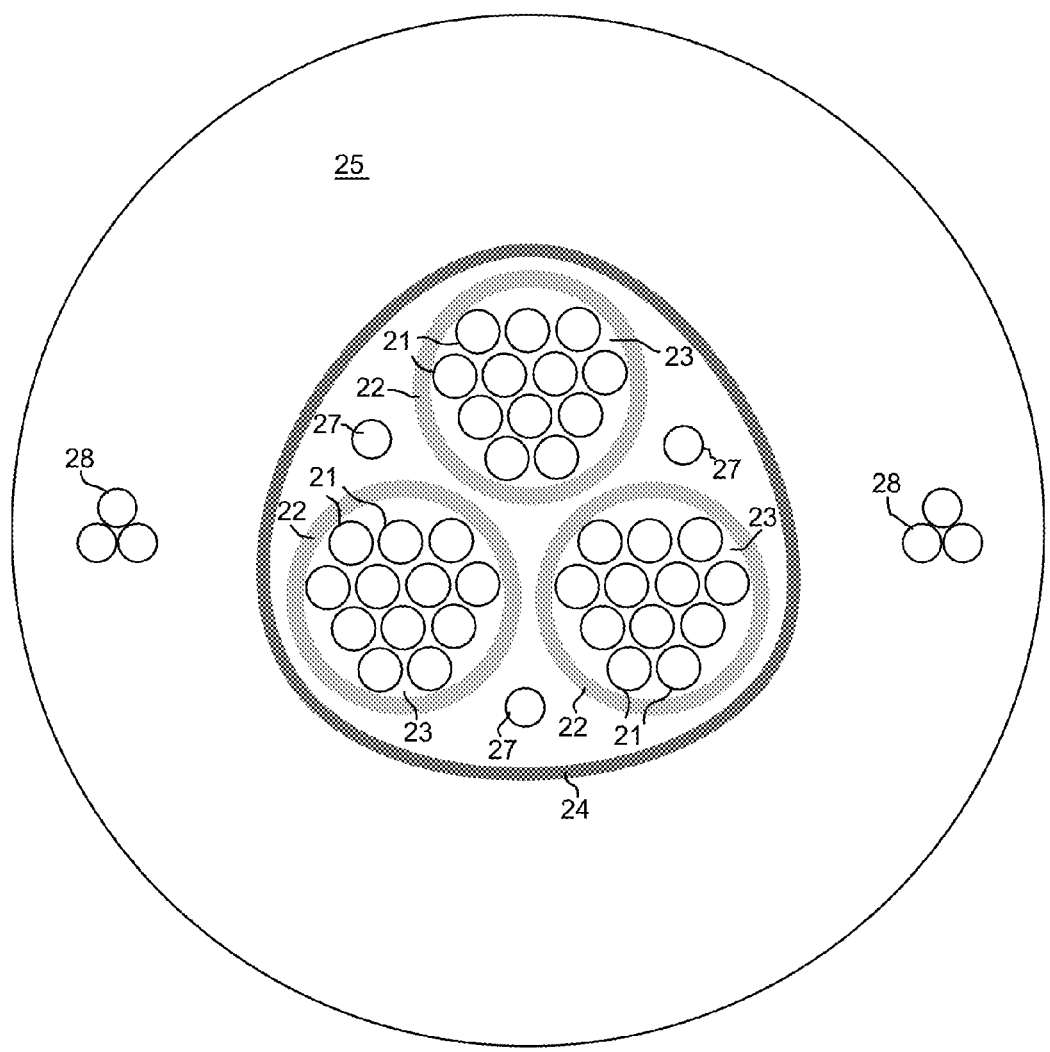
FIG. 2 is a schematic cross section of a cable design of the invention showing three multifiber tight buffer units within a thin-skin containment sheath and an outer jacket.

High optical fiber count aerial cables are produced, according to the invention, by bundling multiple multifiber tight buffer encasement units in a single cable. One prior art approach to this is shown in FIG. 2 of the patent referenced above. However, that cable design is improved upon using the cable design described here. According to this invention the multifiber tight buffer units are bundled within an extruded thin-skin containment sheath, shown at 24 in FIG. 2. The multifiber tight buffer encasement units have the basic unitary construction shown in FIG. 1, with multiple optical fibers 21 in a soft acrylate matrix 23 and within a harder acrylate encasement 22. In this embodiment the cable has three multifiber tight buffer encasement units with the centers of the units at the corners of a triangle. In one implementation of the cable of FIG. 2, three 1.4 mm 12 fiber units are encased together in a 36 fiber cable with a maximum diameter of 3.3 mm. Note that the thin-skin containment sheath 24 is conformal, in this case producing a cable shape that is approximately triangular. Conformal in the context of the invention is intended to mean that the shape of the thin-skin containment sheath has some features or feature that reflect the shape of the bundle of multifiber tight buffer encasement units. The term bundle is intended to mean a group of multifiber tight buffer encasement units assembled together, in most cases with at least some of the units in contact with another unit. In the context of the cable designs described here, a high fiber count cable contains at least twelve optical fibers, and typically more than 24.

The thin-skin containment sheath may be any suitable material which can be extruded in a thin layer without skips or pinholes, and can withstand the stress and temperature ranges of a typical aerial environment. Suitable resins for the thin-skin containment sheath include LDPE, LLDPE, other polyethylenes, impact-modified polypropylenes, ethylene/vinyl acetate polymers, plasticized PVC, and blends of the above. Mineral fillers or other fillers may be added to the base resin to reduce shrinkage and thermal expansion, and improve attenuation performance as a function of temperature.

In some installations it may be beneficial to route the aerial cable though a portion of the interior of a building being served. In this case fillers may be used to impart flame retardancy to the thin-skin containment sheath. In a preferred embodiment the thin-skin containment sheath is fabricated from Megolon 8110 UV BK, a nonhalogen flame retardant resin commercially available from AlphaGary, Leominster, Mass. and Melton Mowbray, UK. Alternative to a thin-skin containment sheath, multiple multifiber tight buffer units may be bound together with yarns or threads. The thickness of the thin-skin layer is less than approximately 0.3 mm, preferably less than 0.15 mm.

To inhibit unwanted water incursions from traveling along the length of the cable waterswellable yarns or other waterswellable material, shown at 27 in FIG. 2, can be run within the multifiber tight buffer units. As is evident, in this cable design these elements occupy "free space", i.e., do not add to the dimensions of the cable.

Figure 3:
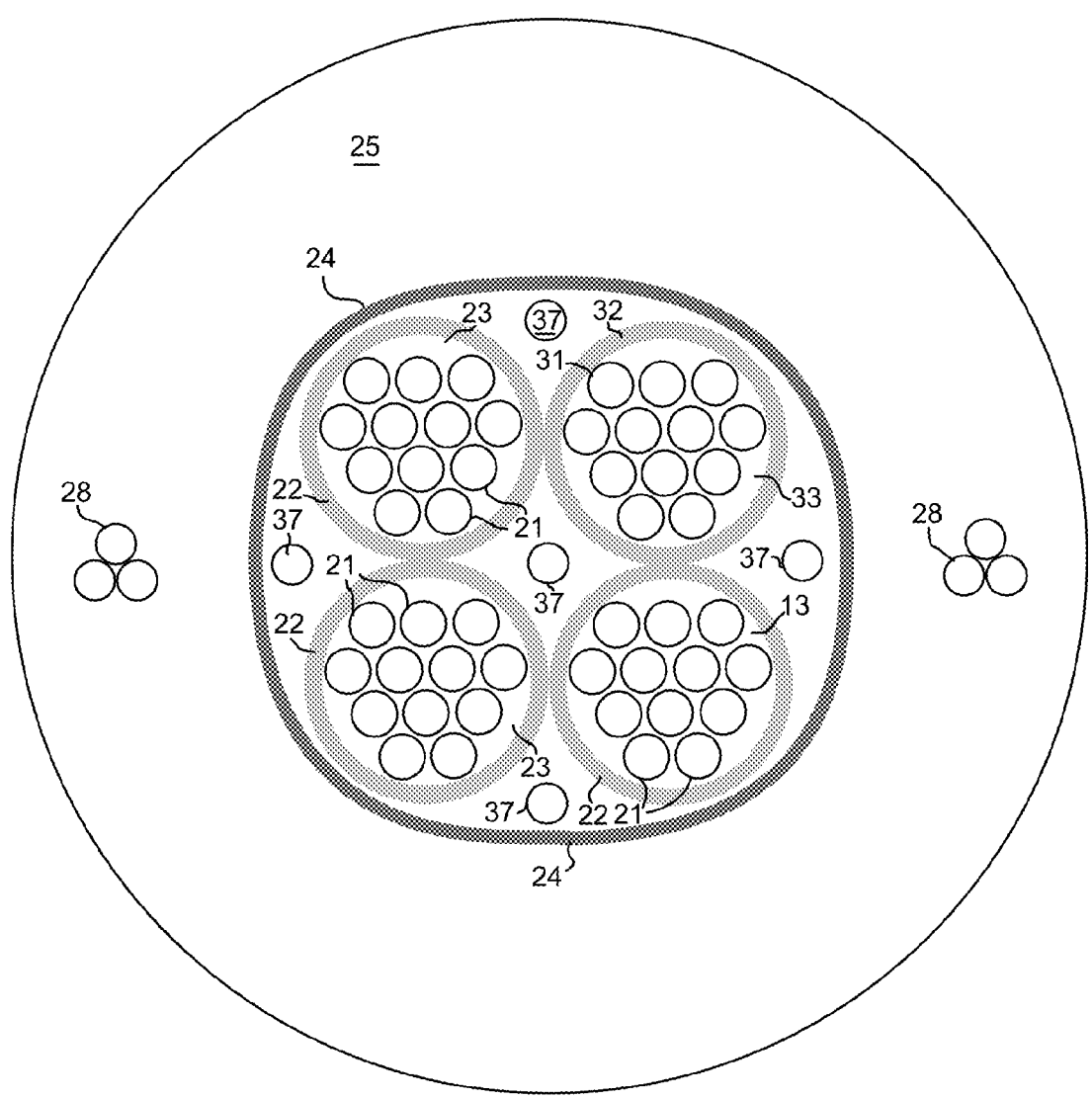
FIG. 3 is a schematic cross section of a larger fiber count cable similar to that of FIG. 2.

The aerial cable designs of the invention have at least three units. There may be more than three units, as desired. A cable with four multifiber tight buffer encasement units is illustrated in FIG. 3. In a preferred embodiment of the cable shown in FIG. 3, four 1.4 mm 12 fiber units are encased together in a 48 fiber cable with a maximum diameter of 3.6 mm. In FIG. 3 the elements common to FIGS. 2 and 3 have the same reference numbers. The added multifiber tight buffer encasement unit comprises elements 31-33. This embodiment shows five waterswellable yarns 37.

The combination of the multifiber tight buffer encasement units with the extruded thin-skin containment sheath produces an overall cable that is lighter and smaller than prior art designs. This result is partly due to the elimination of the reinforcing yarn layer that is used in some prior art aerial cable designs. The reinforcing yarn layer complicates the manufacture of the aerial cable and adds expense.

Referring again to FIGS. 2 and 3, an outer polymer cable jacket 25 is formed around the thin-skin containment sheath. The cable jacket thickness may be, for example, 10-20 mils. Suitable cable jacket polymers are PVC, PVDF, FEP, PTFE, compounded fluoropolymer blends. The cable jacket may contain steel or fiberglass strength members, 28, or other suitable cable reinforcement.

An advantage of using UV-cured acrylates in the dual-layer acrylate buffer encasement is that the cabling operation used to apply UV-cured coatings is rapid and cost effective. The dual-layer acrylate coatings may be applied in tandem or simultaneously (using a two compartment and dual die applicator). Other transparent coating materials, such as alkyl-substituted silicones and silsesquioxanes, aliphatic polyacrylates, polymethacrylates and vinyl ethers have also been used as UV cured coatings. See e.g. S. A. Shama, E. S. Poklacki, J. M. Zimmerman "Ultraviolet-curable cationic vinyl ether polyurethane coating compositions" U.S. Pat. No. 4,956,198 (1990); S. C. Lapin, A. C. Levy "Vinyl ether based optical fiber coatings" U.S. Pat. No. 5,139,872 (1992); P. J. Shustack "Ultraviolet radiation-curable coatings for optical fibers" U.S. Pat. No. 5,352,712 (1994). The coating technology using UV curable materials is well developed. Coatings using visible light for curing, i.e. light in the range 400-600 nm, may also be used. The preferred coating materials are acrylates, or urethane-acrylates, with a UV photoinitiator added.

The inner layer and outer layer materials may be characterized in various ways. From the general description above it is evident that the modulus of the inner layer should be less than the modulus of the outer layer. Using the ASTM D882 standard measurement method, the recommended tensile modulus for the inner layer is in the range 0.1 to 50 MPa, and preferably 0.5 to 10 MPa. A suitable range for the outer layer is 100 MPa to 2000 MPa, and preferably 200 MPa to 1000 MPa.

The layer materials may also be characterized using glass transition temperatures. It is recommended that the $T_g$ of the inner layer be less than 20 degrees C., and the $T_g$ of the outer layer greater than 40 degrees C. For the purpose of this description the glass transition temperature, Tg, is the point in the middle of the transition curve.

The individual optical fibers in the multifiber tight buffer units may be color coded to aid in identifying and organizing the optical fibers for connecting. The multifiber tight buffer units may also be color coded to provide additional aid in organizing the optical fibers.

The compact size of the optical fiber buffer encasement allows for manufacture of smaller cables than typically found in competing cable designs. Prior art aerial cables or ABFU/conduit systems typically have up-to 12 fibers in a 6 mm diameter conduit. However, aerial cable disclosed as one embodiment of the invention is capable of holding 36 or 48 fibers in a 7 mm diameter cable. Therefore, the inventive cable has much higher fiber packing density compared to prior art aerial distribution cables. In one example, the inventive cable achieved a packing density greater than 1 fiber per square mm. In general, preferred cable designs of the invention have more than 0.5 fibers per square mm. Fiber packing density is defined as number of fibers inside per square millimeter of cable area based on the cable OD.

Also, the inventive cable may be very lightweight. For example, 7.0 mm 36 fiber aerial cable designed according to the description above may weigh only 32.9 kg/km, and 7.0 mm 48 fiber aerial cable may weigh only 34.4 kg/km. Typically, preferred cable designs of the invention will have a diameter of less than 10 mm and a weight of less than 40 kg/km. This light weight at a relatively small diameter affords a relatively long span length between poles without use of additional lashing, and allows for installation of the cables in existing aerial rights-of-way without reinforcement or replacement of existing poles.

Other benefits of aerial cables designed according to the invention, in addition to size reduction, is the installation cost reduction attributable to installing the cable in one step. Installation may be based on known approved conduit, leading to minimal training for installation. Also, bundling the units together under a common skin makes it easier to store and handle the cable core in closures and installations to end users, giving installers flexibility. The bundled units may be handled as a single entity or may be broken out into individual subunits at the discretion of the installer.

Whereas the emphasis in the foregoing is on optical fiber cable designs adapted for aerial installations it should be understood that these high fiber count, small, lightweight cables may find a variety of other uses. The cable structures described above may be installed in a variety of installations. Some of these are described in detail in Chapter 14 of the "The Second Edition Handbook of PE Pipe", published by the Plastics Pipe Institute (http://plasticpipe.org/pdf/chapter14/pdf), incorporated by reference herein.

The following gives experimental results of embodiments of the inventive aerial cable.

Mechanical Tests were performed on TR-11-092, a prototype 36-fiber, 7.0 mm diameter cable with the structure shown in FIG. 2 to ensure mechanical feasibility of the cable. Tensile loading, compression, torsion, impact and temperature cycling tests were performed following the test methods called out in the relevant TIA Fiber Optic Test Procedures (FOTPs). A bend test was performed by wrapping the cable three times around a 3" (7.5 mm) diameter mandrel, a method commonly called out in the specifications of BT plc. In all cases, fiber attenuation at 1550 nm was monitored during the application of the mechanical stress, and the maximum change in attenuation is reported. Tests were performed on fibers from all three units:

Unit 1: 12 OFS G.657.A1 AllWave Flex Singlemode Fibers (4 Tested)
Unit 2: 12 OFS G.657.A1 AllWave Flex Singlemode Fibers (4 Tested)
Unit 3: 12 OFS G.657.A1 AllWave Flex Singlemode Fibers (4 Tested)

Test Results: 7.0 mm 36f Aerial Distribution Cable

| Mechanical Tests | Results, 1550 nm | |
|---|---|---|
| | Mean Added Loss | Maximum Added Loss |
| Tensile, 770N (2.4W; 0.6% fibre strain) | 0.00 dB | 0.02 dB |
| Tensile, 960N (3W; 0.67% fibre strain) | 0.00 dB | 0.02 dB |
| Compression, 500N/cm | 0.02 dB | 0.11 dB |
| Torsion, 1 m, 180° | 0.00 dB | 0.02 dB |
| Impact, 10N-M | 0.00 dB | 0.02 dB |
| Cable Bend - 3 wraps, 72 mm mandrel | 0.01 dB | 0.08 dB |

| Environmental Tests | Results, 1550 nm | |
|---|---|---|
| | Mean Loss | Maximum Loss |
| 23° C. | 0.187 dB/km | 0.203 dB/km |
| −40° C. | 0.185 dB/km | 0.201 dB/km |
| 70° C. | 0.190 dB/km | 0.210 dB/km |

In concluding the detailed description, it should be noted that it will be obvious to those skilled in the art that many variations and modifications may be made to the preferred embodiment without substantial departure from the principles of the present invention. All such variations, modifications and equivalents are intended to be included herein as being within the scope of the present invention, as set forth in the claims.

The invention claimed is:

1. An optical fiber cable that is suitable for an aerial installation without a microduct comprising:
 (a) a bundle of at least three multifiber tight buffer encasement units, the multifiber tight buffer encasement units each comprising:
  i. at least two optical fibers encased in a polymer matrix, the polymer matrix having a first modulus,
  ii. a polymer layer encasing the polymer matrix, the polymer layer having a second modulus where the second modulus is greater than the first modulus,
 (b) a thin skin containment layer surrounding the bundle of multifiber tight buffer encasement units, and conforming to the shape of the bundle of multifiber tight buffer encasement units; and
 (c) a cable jacket surrounding the thin skin containment layer, wherein the cable jacket contains at least one strength member.

2. The optical fiber cable of claim 1 wherein both the polymer matrix and the polymer layer comprise UV cured acrylates.

3. The optical fiber cable of claim 1 wherein the modulus of the polymer matrix is in the range 0.1 to 50 MPa.

4. The optical fiber cable of claim 3 wherein the modulus of the polymer matrix is in the range 0.5 to 10 MPa.

5. The optical fiber cable of claim 3 wherein the modulus of the polymer layer is in the range 100 MPa to 2000 MPa.

6. The optical fiber cable of claim 4 wherein the modulus of the polymer layer is in the range 200 MPa to 1000 MPa.

7. The optical fiber cable of claim 2 wherein the glass transition temperature of the polymer matrix is less than 20 degrees C.

8. The optical fiber cable of claim 7 wherein the glass transition temperature of the polymer layer is greater than 40 degrees C.

9. The optical fiber cable of claim 1 wherein the cross section of the cable has a diameter of less than 10 mm.

10. The optical fiber cable of claim 9 wherein the weight of the cable is less than 40 lb/km.

11. The optical fiber cable of claim 1 wherein the optical fibers are color-coded.

12. The optical fiber cable of claim 1 wherein the multifiber tight buffer encasements are color-coded.

13. The optical fiber cable of claim 1 wherein the buffer encasement is coated with flame retardant material.

14. The optical fiber cable of claim 1 wherein the thin-skin containment layer has a thickness of less than 0.3 mm.

15. The optical fiber cable of claim 1 wherein the total number of optical fibers in the cable is greater than 11 and the optical fiber packing density is greater than 1 fiber per square mm.

16. A method for installing an optical fiber cable that is suitable for an aerial installation without a microduct above ground and attached to a customer premises by the step of connecting the cable to the exterior of the premises, the method characterized in that the optical fiber cable comprises:
(a) a bundle of at least three multifiber tight buffer encasement units, the multifiber tight buffer encasement units each comprising:
  i. at least two optical fibers encased in a polymer matrix, the polymer matrix having a first modulus,
  ii. a polymer layer encasing the polymer matrix, the polymer layer having a second modulus where the second modulus is greater than the first modulus,
(b) a thin skin containment layer surrounding the bundle of multifiber tight buffer encasement units, and conforming to the shape of the bundle of multifiber tight buffer encasement units, and
(c) a cable jacket surrounding the thin skin containment layer, wherein the cable jacket contains at least one strength member.

17. The optical fiber cable of claim 1, wherein the weight per length of the optical fiber cable is less than 35 kg/km.

18. The optical fiber cable of claim 1, wherein the fiber packing density of the optical fiber cable is greater than or equal to 0.90 fiber/mm$^2$.

19. The optical fiber cable of claim 18, wherein the outer diameter of the optical fiber cable is approximately 7 mm and the optical fiber cable holds 36 optical fibers.

20. The optical fiber cable of claim 18, wherein the fiber packing density of the optical fiber cable is greater than or equal to 1.20 fiber/mm$^2$.

21. The optical fiber cable of claim 20, wherein the outer diameter of the optical fiber cable is approximately 7 mm and the optical fiber cable holds 48 optical fibers.

* * * * *